United States Patent [19]

Jülich

[11] Patent Number: 4,542,769

[45] Date of Patent: Sep. 24, 1985

[54] COUPLING ARRANGEMENT FOR CONTROLLING THE HARNESSES IN A WEAVING MACHINE

[75] Inventor: Werner Jülich, Wallisellen, Switzerland

[73] Assignee: Sulzer Brothers Limited, Winterthur, Switzerland

[21] Appl. No.: 551,702

[22] Filed: Nov. 14, 1983

[30] Foreign Application Priority Data

Dec. 3, 1982 [EP] European Pat. Off. ........ 82810522.1

[51] Int. Cl.⁴ .............................................. D03C 1/00
[52] U.S. Cl. .................................... 139/66 R; 139/76; 192/28
[58] Field of Search ................................ 139/66 R–76; 192/28

[56] References Cited

U.S. PATENT DOCUMENTS

| 4,404,993 | 9/1983 | Julich et al. | 139/66 R |
| 4,427,035 | 1/1984 | Hintsch et al. | 139/76 |
| 4,441,528 | 4/1984 | Julich | 139/66 R |

FOREIGN PATENT DOCUMENTS 2741199  2/1979  Fed. Rep. of Germany ........ 139/76

Primary Examiner—James Kee Chi
Attorney, Agent, or Firm—Werner W. Kleeman

[57] ABSTRACT

A locking lever is articulated to a latch. The locking lever is pivoted or swung out against the action of a spring and the pivoting or swinging movement is limited by a stop mounted at an eccentric. The opposite pivoting or swinging movement of the locking lever is limited by a surface at the locking lever which runs-up against a surface at the latch. Upon rotation of a drive shaft carrying the eccentric the latch can now assume a decoupling or decoupled position. Due to the provision of control levers with hook-shaped ends which, when pivoted into a predetermined position, cause the locking lever to run-up or travel against one of the hook-shaped ends, the latch is only then caused to be decoupled when subsequently and in accordance with the weaving program a decoupling operation of the latch is really intended to take place. Otherwise the latch is not decoupled because in that case the locking lever cannot run-up against one of the hook-shaped ends of the control levers.

6 Claims, 5 Drawing Figures

COUPLING ARRANGEMENT FOR CONTROLLING THE HARNESSES IN A WEAVING MACHINE

BACKGROUND OF THE INVENTION

The present invention relates to a new and improved coupling arrangement for controlling the harnesses or the like in a weaving machine or loom for weaving a fabric in acccordance with a predetermined weaving program.

In its more particular aspects the present invention relates to a new and improved coupling arrangement for controlling the harnesses in a weaving machine for weaving a fabric in accordance with a predetermined weaving program, which coupling arrangement comprises an intermittently rotating drive shaft which contains at least one groove, a latch or latching element engageable with the groove and arranged at an eccentric which, in turn, is rotatably mounted upon the drive shaft, and a bracket which encloses the eccentric and which is provided at a connecting rod establishing a driving connection to the harnesses of the weaving machine or loom. The coupling arrangement further comprises locking means arranged at the eccentric for locking the latch into a coupling position with the drive shaft, and control means for controlling the latch and the harnesses in accordance with the weaving program for the fabric or cloth to be produced.

In an arrangement of the aforementioned type as known, for example, from European Patent Publication No. 0050160-A1, published Apr. 28, 1982, a locking lever is pivotably mounted to the eccentric and revolves with the eccentric so as to be alternatingly moved against two run-up surfaces which are arranged at the bracket at the connecting rod and which protrude into the travel path of a rearward or trailing end of the locking lever. By means of these run-up surfaces, the locking lever is pivoted twice into an unlocking position during each revolution of the eccentric. Consequently, the latch is also prepared for a decoupling operation twice per revolution, in particular even then when the latch is intended to remain in its coupled position for the next weft insertion of the weaving machine in accordance with the weaving program. In case that for whatever reason stronger shocks or vibrations occur in the weaving machine as, for example, also during shut down thereof precisely during this time interval when the latch is unlocked without subsequent decoupling of such latch, the latch may be unintentionally decoupled due to the temporary unlocking thereof, whereby operational malfunctions can occur.

SUMMARY OF THE INVENTION

Therefore, with the foregoing in mind it is a primary object of the present invention to provide an improved construction of a coupling arrangement for controlling the harnesses or the like in a weaving machine or loom in which operational failures due to unintentional decoupling of the latch or latching element are prevented.

Now in order to implement this and still further objects of the invention, which will become more readily apparent as the description procedes, the coupling arrangement of the present development is manifested by the feature that the locking means or device for the latch is controlled by a control element which is operatively connected to programmable control means. Consequently, the latch or latching element is unlocked and prepared for decoupling only in those cases where a decoupling operation is actually intended to be initiated by the programmable control means on the basis of the weaving program for the fabric or cloth in production. In all other cases where the latch is not intended to be decoupled, the latch is not unlocked. The coupling arrangement thus operates particularly reliably and the latch cannot be unintentionally decoupled as perhaps by vibrations.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
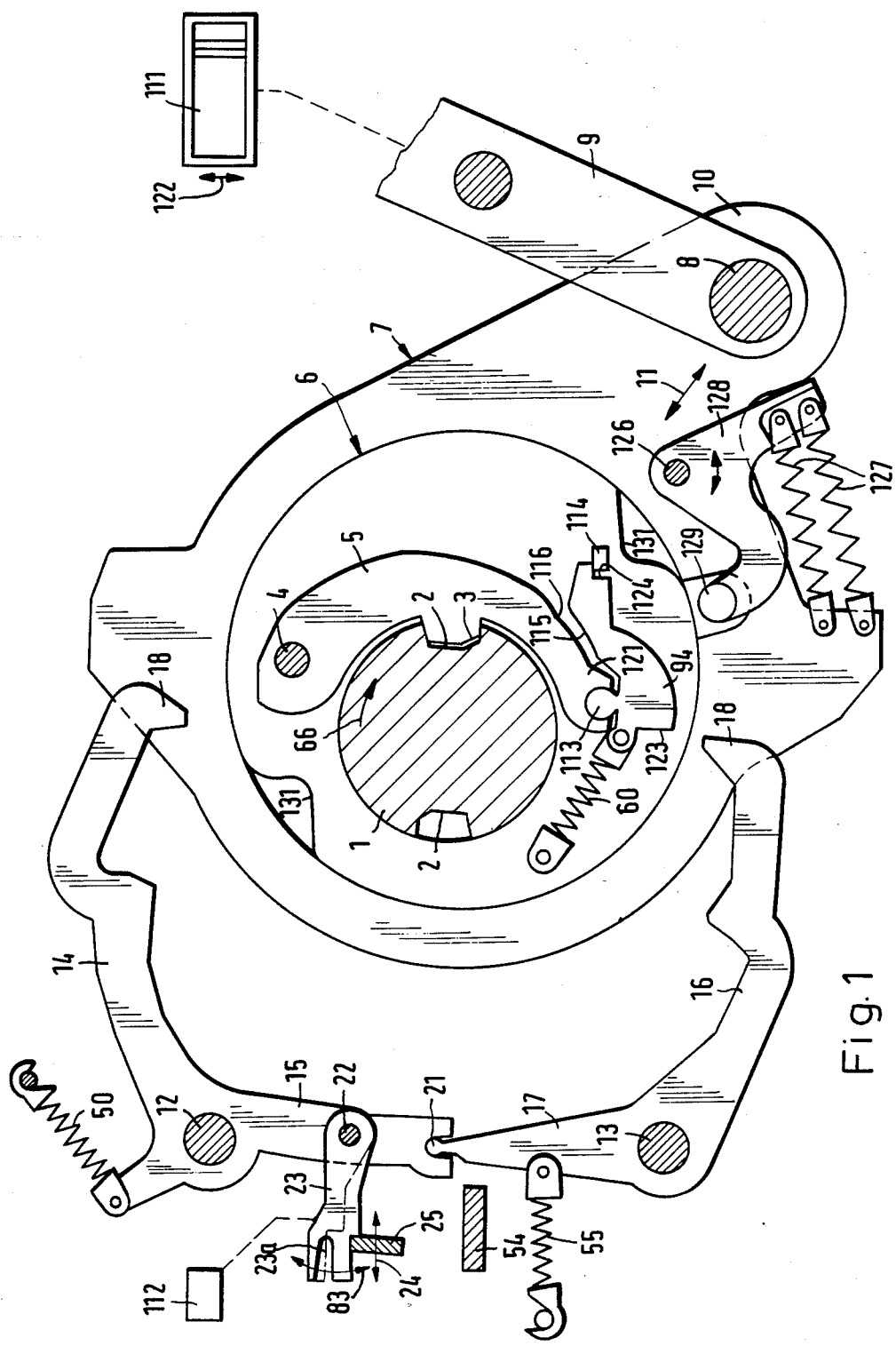
FIG. 1 is a schematic and partial sectional view through a first embodiment of coupling arrangement constructed according to the invention for controlling the weaving harnesses in a weaving machine or loom.

Describing now the drawings, it is to be understood that only enough of the construction of the exemplary embodiments of the inventive coupling arrangements and related loom or weaving machine structure has been shown as needed for those skilled in the art to readily understand the underlying principles and concepts of the present development, while simplifying the showing of the drawings. Turning attention now specifically to FIG. 1, there has been shown in section a drive shaft 1 which is intermittently rotated each time through 180° by the main shaft of the weaving machine or loom. The drive shaft 1 contains two grooves or recesses 2 with which a lug or dog 3 of a coupling latch or latching element 5 can be engaged which is pivotably mounted at pivot pin 4 or the like. The latch 5 is mounted at an eccentric or eccentric member 6 which is enclosed by a bracket 7 and which is rotatably mounted upon the drive shaft 1. The bracket or bracket member 7 forms the end of a connecting rod 10 which is linked at pivot pin 8 or the like to a transmission mechanism or rod 9 by means of which the reciprocation or to-and-fro movement of the bracket 7 and of the connecting rod 10, as indicated by the arrow 11, is transmitted to an associated and here only schematically indicated harness 111 or equivalent structure of the weaving machine.

A whole number, for example, in a range of six to twelve of the driving members 6 and 7 illustrated in FIG. 1, is arranged at the drive shaft 1, namely an eccentric 6 and a bracket 7 for each harness 111 of the weaving machine. All the members or components 1, 6 and 7 form the so-called eccentric or cam machine or mechanism for driving and controlling all of the weaving harnesses 111 of the weaving machine. The harnesses 111 are moved into an upper shed and a lower shed position in correspondence to a predetermined weaving program for the warp threads.

Two control levers 14, 15 and 16, 17 are installed for actuating the latch or latching element 5 during the operation of the weaving machine and such contain hooks or hook-like portions 18 at their respective free ends. The control levers or lever members 14, 15 and 16, 17 are pivotably mounted at stationary pivot pins 12 and 13, respectively. The control lever 14, 15 is under the action of a tension spring 50 which tends to pivot such control lever 14, 15 in clockwise direction. The other control lever 16, 17 is under the action of a tension spring 55 which tends to pivot such control lever 16, 17 in counter-clockwise direction. The control levers 14, 15 and 16, 17 comprise respective lever arms 15 and 17 which are hingedly connected or linked to each other at pivot connection 21. The pivoting movement which is caused by the springs 50, 55 is limited by a stationary stop or abutment member 54 which is positioned in the pivot path of the lever arm 17.

A plate 23 is linked to the lever arm 15 as at hinge pin 22 and is pivotable as indicated by the double-headed arrow 83. This plate or plate member 23 can cooperate with a stroke meter or blade 25 or equivalent structure which is continuously reciprocated or moved to-and-fro as indicated by the double-headed arrow 24 during operation of the weaving machine. Any suitable programmable control means 112, which has only been schematically indicated, is provided, and the plate 23 is moved by the programmable control means 112 into the lower position illustrated in FIG. 1 in accordance with the weaving program. In this lower position the plate 23 engages with the stroke meter 25. The plate 23 also can be elevated to an inoperative upper position 23a, indicated by dash-dotted lines, by the control means 112 and in which position this plate 23 is disengaged or decoupled from the stroke meter 25.

At its free end the latch or latching element 5 possesses a claw or claw portion 121. Within the claw 121 there is accommodated the dog or nose member 113 of a locking lever 94, and this locking lever 94—which also can be referred to as a locking and unlocking lever—is mounted to be pivotable about a pivot point or hinge defined by the dog 113. The locking lever 94 is exposed to the action of a tension spring 60 which tends to pivot the locking lever 94 about the dog 113 and, simultaneously, the latch 5 about pivot pin 4, each in clockwise direction. Pivoting of the locking lever 94 is limited by a stop or abutment member 114 which is arranged at the eccentric 6.

The mode of operation of the coupling arrangement as described hereinbefore is as follows:

In the position of the members as illustrated in FIG. 1, the control levers 14, 15 and 16, 17 and their hooks or hook-like portions 18 are in their swung-out or outwardly pivoted inoperative position because the plate 23 is engaged with the stroke meter 25. Upon rotation of the drive shaft 1 in the direction of the arrow 66 the locking lever 94 travels past the hook 18 of the control lever 16, 17 without running-up against or impacting the hook 18. Consequently, the latch or latching element 5 remains coupled and locked and the harness 111 is further reciprocated up-and-down as indicated by the double-headed arrow 122.

Figure 2:
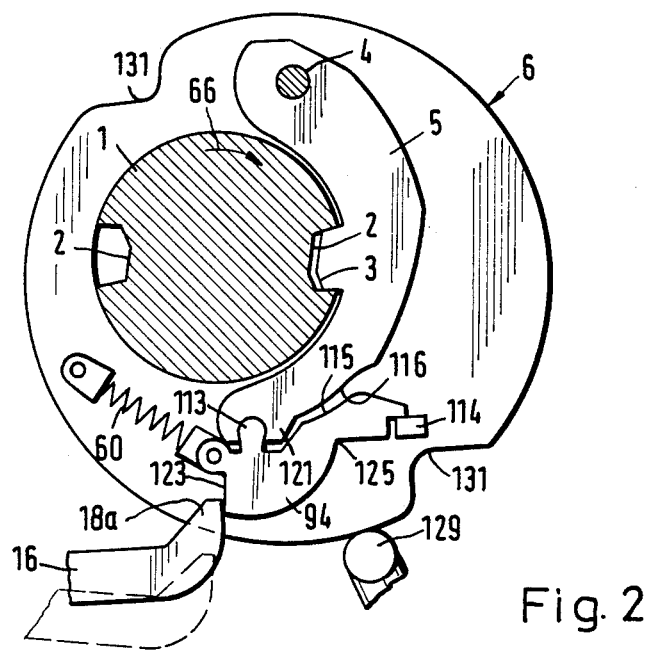
FIGS. 2 to 4 illustrate different operative positions of the coupling arrangement shown in FIG. 1.
Figure 3:
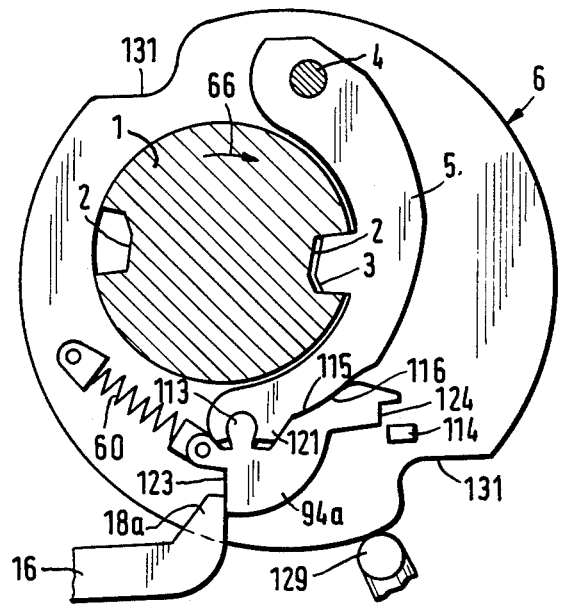

Thereafter the stroke meter 25 or equivalent actuator is moved to the left as seen in FIG. 1, so that now the lever arm 17 of the control lever 16, 17 runs-up against or impacts the stop 54. At the same time the plate 23 also travels towards the left. Assuming now that the plate 23 is elevated by the programmable control means 112 into the inoperative position, then the hooks 18 remain in their operative decoupling position 18a into which they are pivoted, and which is shown in FIG. 2, as long as the plate 23 remains disengaged from the stroke meter 25. The locking lever 94, then, can run-up against one of the hooks 18 by means of a stop or impact edge or surface 123 formed at the locking lever 94. Upon further rotation of the drive shaft 1 the locking lever 94 is pivoted about dog or nose member 113 in counter-clockwise direction against the action of the spring 60 and into the position 94a as shown in FIG. 3. This constitutes the first phase of the decoupling operation of the latch or latching element 5. A stop or impact surface 115 formed at the locking lever 94 and a stop or impact surface 116 formed at the latch 5 now contact each other. A shoulder or step portion 124 which is formed at the locking lever 94 now is lifted-off the stop 114. The decoupling of the latch or latching element 5 thus is prepared.

Figure 4:
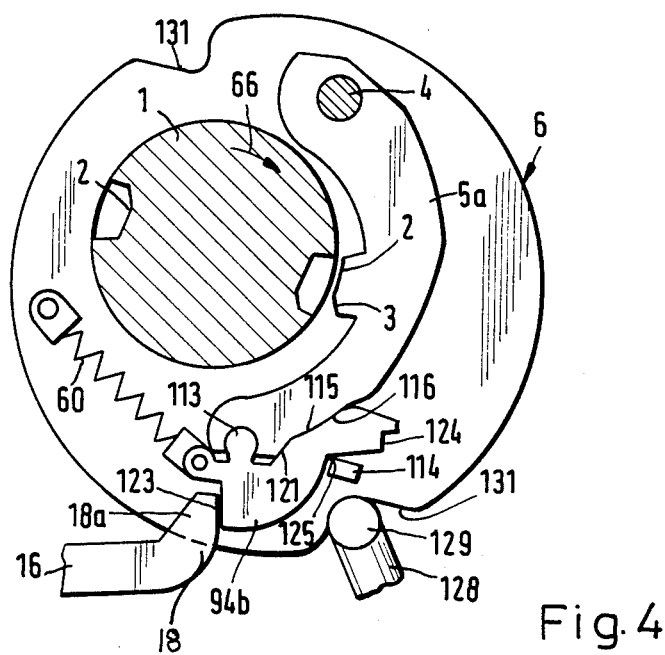

Upon further rotation of the drive shaft 1 the latch 5 is pivoted into the decoupling position 5a which is illustrated in FIG. 4 of the drawings. The locking lever 94 participates in such pivoting movement and is moved during this second phase of the decoupling operation of the latch 5 into the position 94b as shown in FIG. 4. In the position 94b a recess 125 formed in the locking lever 94 runs-up against the stop or abutment 114. The pivoting movement of the locking lever 94 and of the latch 5 is thus limited. At the same time a retaining roller 129 travels into one of the recesses 131 formed at the eccentric 6. This retaining or clamping roller 129 is journaled at a lever 128 which is under the action of springs 127 and which is journaled for pivoting about a pivot point or pin 126. The coupling arrangement now is in a locked decoupling position. Upon further rotation of the drive shaft 1 the harnesses 111 are no longer moved but remain in the upper or lower shed position which they assume.

This state will last until the plate 23 is again lowered by the control means 112 and driven by the stroke meter 25. The control levers 14, 15 and 16, 17 are thus reciprocatingly pivoted in and out in the rhythm or cyclical operation of the stroke meter 25. After the control levers 14 to 17 have been pivoted or swung-out the first time, the latch 5 and the locking lever 94 immediately snap back from their decoupling position, as shown in FIG. 4, into the coupling position as shown in FIG. 1. Again, the members are also locked in this position because the shoulder 124 at the locking lever 94 again abuts the stop or abutment 114. The harness 111 now is again entrained until the plate 23 is again disengaged from the stroke meter 25.

Figure 5:
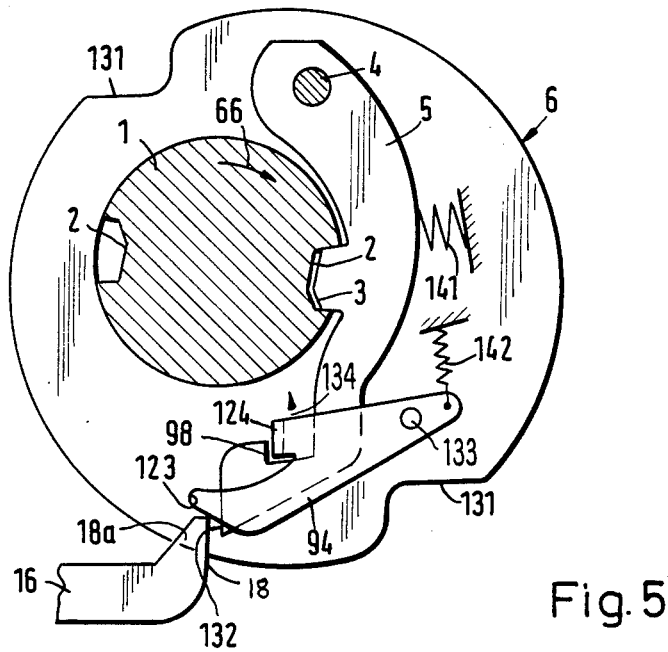
FIG. 5 is a schematic and partial sectional view of a second embodiment of the coupling arrangement.

In the second embodiment of the coupling arrangement according to the invention, as illustrated in FIG. 5, the locking lever 94—which also can be referred to as a locking and unlocking lever—is pivotably mounted immediately at the eccentric 6 as at pivot pin 133. Upon rotation of the drive shaft 1, and with the control levers 14, 15 and 16, 17 in the pivoted or swung-in position, the stop or impact surface 123 at the locking lever 94 which is under the action of a tension spring 142, firstly runs-up against the lever hook-like end or hook 18 which is in the operative position 18a. The locking lever 94, which comprises a bent-off stop or impact end 124 extending normally to the plane of the drawing, is thus pivoted about pivot point or pin 133 in the direction of the arrow 134. The latch or latching element 5 is thus unlocked at its shoulder 98 and the decoupling operation is thus prepared.

Upon further rotation of the drive shaft 1 the stop or impact surface 132 at the latch 5, which is under the action of a compression spring 141, runs-up or travels against the hook 18, so that the latch 5 is swung-out and thus can be decoupled. In this second embodiment of the inventive coupling arrangement the members 5 and 94 are not located in the same plane, but are positioned in two mutually adjacent planes.

In all constructions herein disclosed it is ensured that the locking lever or means 94 for the latch or latching element 5 is acted upon by a member like, for example, the control levers 14, 15 and 16, 17 which are operatively connected to the programmable control means or device 112. Due to such structure the latch 5 will be prepared for a decoupling operation only when a decoupling operation actually is intended to take place in accordance with the weaving program.

While there are shown and described present preferred embodiments of the invention, it is to be distinctly understood that the invention is not limited thereto, but may be otherwise variously embodied and practiced within the scope of the following claims. Accordingly,

What I claim is:

1. A coupling arrangement for controlling a harness in a weaving machine for weaving a fabric in accordance with a predetermined weaving program, comprising:

an intermittently rotatable drive shaft provided with at least one groove;
   a rotatable eccentric mounted at said drive shaft;
   a latch arranged at said eccentric and engageable with said groove of said drive shaft in a coupled position thereof;
   a bracket enclosing said eccentric;
   a connecting rod providing a driving connection to said harness in said weaving machine and cooperating with said bracket;
   locking means arranged at said eccentric for locking said latch in said coupled position thereof in which said latch is coupled to said drive shaft;
   programmable control means for controlling said latch and said harness in accordance with the predetermined weaving program for said fabric to be produced;
   a control member operatively connected to said programmable control means and controlling said locking means which coacts with said latch;
   said locking means comprising a pivotable lever revolving in conjunction with said eccentric and defining a path of movement;
   said control member defining a control lever moveable into said path of movement of said locking means;
   said pivotable lever forming a locking lever; and
   means for pivotably mounting said locking lever at said latch.

2. A coupling arrangement for controlling a harness in a weaving machine for weaving a fabric in accordance with a predetermined weaving program, comprising:

an intermittently rotatable drive shaft provided with at least one groove;
   a rotatable eccentric mounted at said drive shaft;
   a latch arranged at said eccentric and engageable with said groove of said drive shaft in a coupled position thereof;
   a bracket enclosing said eccentric;
   a connecting rod providing a driving connection to said harness in said weaving machine and cooperating with said bracket;
   locking means arranged at said eccentric for locking said latch in said coupled position thereof in which said latch is coupled to said drive shaft;
   programmable control means for controlling said latch and said harness in accordance with the predetermined weaving program for said fabric to be produced;
   a control member operatively connected to said programmable control means and controlling said locking means which coacts with said latch;
   said locking means comprising a pivotable lever revolving in conjunction with said eccentric and defining a path of movement;
   said control member defining a control lever moveable into said path of movement of said locking means;
   a stop arranged at said eccentric;
   said pivotable lever forming a locking lever; and
   a spring acting on said locking lever to hold the same in engagement with said stop.

3. The coupling arrangement as defined in claim 2, wherein:

said pivotable lever forms a locking lever and contains a stop surface;
   said latch contains a stop surface cooperatable with said stop surface at said locking lever; and
   said stop surface at said locking lever, when the same is pivoted away from said stop, being pressed against said stop surface at said latch in order to limit the pivoting movement of said locking lever.

4. A coupling arrangement for controlling the harnesses of a weaving machine for weaving a fabric according to a predetermined weaving program, comprising:

an intermittently rotating drive shaft comprising at least one groove;
   an eccentric rotatably journaled on said drive shaft;
   a latch arranged on said eccentric and engageable with said groove;
   a connecting rod for driving the harnesses;
   said connecting rod being provided with a bracket surrounding said eccentric;
   locking means for locking said latch in a coupled position relative to said drive shaft;
   control means for controlling said latch and the harnesses in accord with the predetermined weaving program;
   said locking means defining a lever pivotably mounted on said latch;
   said control means comprising control lever arms;
   a programmable control means for controlling said control lever arms of said control means; and
   said control lever arms acting upon said latch through said lever.

5. The coupling arrangement as defined in claim 4, wherein:

said locking means comprises a locking lever having a predetermined locking position;
   a spring;
   stop means; and said locking lever being held against said stop means in said locking position under the action of said spring.

6. The coupling arrangement as defined in claim 4, wherein:

said locking means comprises a locking lever having a predetermined locking position;

a spring;

stop means;

said locking lever being held against said stop means in said locking position under the action of said spring;

said locking lever being capable of performing a pivoting motion;

said locking lever comprising a first stop surface for limiting said pivoting motion thereof;

said latch comprising a second stop surface substantially conformant to said first stop surface; and said locking lever bearing against said second stop surface with said first stop surface when said locking lever is pivoted away from said stop means.

* * * * *